United States Patent [19]

Arnold et al.

[11] 3,928,710

[45] Dec. 23, 1975

[54] HEAT ACTIVATED TRANSFERS

[75] Inventors: Raymond Mills Arnold, Biddenden; Eric Henry Francis Neaves, Lympe; Leslie John Phillips, Ashford, all of England

[73] Assignee: Letraset International Limited, London, England

[22] Filed: July 10, 1973

[21] Appl. No.: 378,237

Related U.S. Application Data

[63] Continuation-in-part of Ser. No. 134,445, April 15, 1971, abandoned.

[30] Foreign Application Priority Data

Apr. 29, 1970 United Kingdom............... 20699/70

[52] U.S. Cl. ................ 428/483; 156/240; 156/277; 156/247; 427/148; 428/195; 428/914
[51] Int. Cl.²................................................ B32B 7/06
[58] Field of Search ........... 156/240, 277, 247, 249; 161/406, 406 T, 231, 252, 247; 117/3.2, 3.3, 3.4, 3.5, 3.6, 6, 10, 36.1, 36.2, 36.4; 428/914

[56] References Cited

UNITED STATES PATENTS

| | | | |
|---|---|---|---|
| 2,990,311 | 6/1961 | Shepherd | 161/406 T |
| 3,276,933 | 10/1966 | Brant | 161/232 |
| 3,516,842 | 6/1970 | Klinker et al. | 117/45 |
| 3,574,049 | 4/1971 | Sander | 161/406 T |
| 3,660,196 | 5/1972 | Keeling et al. | 156/240 |
| 3,671,287 | 6/1972 | Maniar | 117/36.4 |
| 3,708,320 | 1/1973 | Hurst et al. | 117/3.3 |

*Primary Examiner*—Douglas J. Drummond
*Assistant Examiner*—J. J. Gallagher
*Attorney, Agent, or Firm*—Darby & Darby

[57] ABSTRACT

A heat transfer material on polyethylene terephthalate base has an overall layer of an essentially unpigmented hard acrylic resin and a thermoplastic image in printing ink on the acrylic resin layer.

11 Claims, No Drawings

HEAT ACTIVATED TRANSFERS

This application is a continuation-in-part of our application Ser. No. 134,445, filed Apr. 15, 1971, now abandoned.

This invention relates to heat-activatable transfer materials herein referred to, for brevity, as "heat transfers".

Basically a heat transfer comprises a support sheet (carrier) and a layer or image on the carrier which is transferable from the carrier to a receptor surface under the action of heat, generally with only light pressure. A commonly adopted form of heat transfer is one where the transferable layer or image is formed in a thermoplastic material. The effect of heat is to soften the transferable layer or image so that it becomes adhesive and sticks to the receptor surface. Generally, it has been necessary to leave the whole heat transfer stuck to the receptor surface until it cools down, i.e. the thermoplastic material re-hardens. Provided that the bond between the carrier and the re-set thermoplastic material is lower than the bond between the thermoplastic material and the receptor surface the carrier can then be stripped away, leaving the transferred layer or image adherent to the receptor.

Because, generally, a cooling stage must be included, the foregoing type of heat transfer is not suitable for high speed systems where images are to be transferred to a series of articles successively arriving at a heat-transfer applying station, since to allow time for the heat transfer to cool tends to slow up the whole operation and/or to make the apparatus unduly complicated. This is especially so when the system used requires the carrier to be stripped away immediately after the heat has been applied, e.g. on rotary systems working with a ribbon of carrier having successive transferable images along the ribbon.

Suitable thermoplastic materials used in heat-transfers of the type referred to above are, for example, polyvinyl chloride, polymethyl methacrylates and polyvinyl butyrals.

Since the carrier must be strippable from the thermoplastic material of the transferable layer (at least when cold) it is important that these should not bond together during the heating operation. It is accordingly undesirable to employ a carrier which is itself a readily thermoplastic material since the heating operation may then strengthen the bond between carrier and transferable layer by interfacial mixing. Commonly, therefore, carrier material such as paper has been employed and this has been provided with so-called "release" surface, i.e. a surface from which the transferable layer can be readily released.

It has been proposed as an alternative to the foregoing system to provide a heat transfer which comprises a carrier which is of paper, film or film/paper laminate, said carrier being free from any applied surface release layer, and, covered by said carrier, a layer or printed image of a transferable material comprising a thermoplastic resinous material and a wax, any film material present in or constituting the carrier having, if thermoplastic, a softening temperature higher than the softening temperature of the resin of the transferable material, and the wax of the transferable layer having a softening point not higher than the softening point of the thermoplastic resinous material.

Thus for example the transferable layer or printed image may be applied to a polyethylene terephthalate carrier film and be formulated from polystyrene, hydrogenated castor oil wax (or other waxy substance) and pigment. Such transferable material is normally applied by screen-process printing since the presence of the wax or wax-like substance in the printing ink tends so to thicken the ink as often to render it unsuitable for application by other methods, e.g. by gravure or flexographic methods where a free-flowing ink (preferably showing properties as near as possible to Newtonian flow) is necessary.

A further difficulty with heat transfers has been in the application of decorations, symbols and the like by heat-transfer to surfaces of polyethylene or polypropylene. Hitherto, in the application of designs by heat transfer onto such polyethylene and polypropylene materials, it has been necessary to subject the polyethylene or polypropylene surface not only to flame-treatment, corona discharge or chromic acid treatment, prior to the transfer application in order to increase the acceptance of the transfer by the polyethylene or polypropylene surface, but also to flame, or otherwise heat treat the decorated surface after the application of the transfer image to increase its bond to the polyethylene or polypropylene surface.

It is an object of the present invention to provide heat transfers which may be produced by gravure, flexographic and like processes but which nevertheless still offer the advantage of immediate transfer on application of the transfer heat and pressure without the necessity of waiting for the assembly to cool.

It is a particular object of the further invention to provide heat transfers suitable for transfer to polyethylene or polypropylene without treatment of the decorated surface after transfer.

As a result of considerable research and experimentation it has now been found that whilst an essentially unpigmented layer of hard acrylic resin will adhere firmly to a polyethylene terephthalate film base at ordinary temperatures the adhesion is reduced or destroyed at elevated temperatures, e.g. at temperatures between 100°C and 200°C. It has been observed that if the acrylic resin layer is pigmented the release at elevated temperature either does not take place or is less certain or complete. Accordingly, it is not practical to use the acrylic resin as the basis for a pigmented printing ink to be printed onto the polyethylene terephthalate base. The present invention makes use of the foregoing experimental observations.

According to the present invention there is provided a heat transfer material which comprises a film carrier of polyethylene terephthalate, a thermoplastic layer of acrylic resin adherent to said film carrier, said layer being essentially unpigmented, and a thermoplastic image in printing ink printed upon said acrylic resin layer, the acrylic resin having a hardness sufficient to reduce the bond between the polyethylene terephthalate carrier and acrylic layer upon application of heat, such bond at elevated temperatures being weaker than the bond between the thermoplastic image and a receiver surface at such elevated temperatures, whereby the carrier film may be stripped from said acrylic layer at substantially the same temperatures used to effect image transfer.

The acrylic resin used must have a hardness sufficient to reduce the bond between the polyethylene terephthalate carrier and acrylic layer upon application of heat, such bond at elevated temperatures being weaker than the bond between the thermoplastic image and a receiver surface. Such acrylic resins have a clear film Knoop hardness number (Tukon) of at least 18 after they have been stoved at 180°F for 30 minutes, or a pencil hardness after they have been stoved at 180°F for 30 minutes of at least 2H.

On applying a said heat transfer to a suitable receptor surface under the action of heat and mild pressure the ink image softens and adheres to the receptor surface and the bond between the acrylic resin and the polyethylene terephthalate carrier film is reduced or broken so that the carrier film may be peeled away without waiting for the assembly to cool. Since the acrylic resin remains adherent to the ink image it provides, on the receptor surface, a hard covering which serves to protect the transferred image against damage. By applying heat and pressure to an area larger than that occupied by the image alone, when the transfer has taken place the hard acrylic covering will cover not only the transferred image but will also overlap onto the surrounding receptor surface to which it also adheres. This provides a surface finish and protective covering for the surrounding receptor surface and the edge of the image as well as for the image itself. It also helps retain the image in place, requiring less adhesion of the image to receptor surface than if no such overlap is present.

The carrier film may be a commercially available polyethylene terephthalate film such as is sold under the registered Trade Marks MELINEX and MYLAR.

As noted, the acrylic resin used to produce the coating on the carrier film should be a hard resin. Chemically the resin may be a polymer of an acrylic or methacrylic ester or a copolymer of such esters, or corresponding acids, with other monomers copolymerisable therewith. Hard acrylic resin found to be of particular value is that sold by Rohm and Haas Co. under the Trade Marks PARALOID A.11 (as 100% solid resin) and PARALOID A.10 as a 40% by weight solution in ethylene glycol monoethyl ether acetate). A similar resin is sold as NEOCRYL B702 by Polyvinyl Chemie Holland N.V.

For transfer to polyethylene or polypropylene the thermoplastic image in printing ink should comprise a thermoplastic linear polyamide resin. Such heat transfer materials require only the pre-treatment, e.g. by flame, corona discharge or chromic acid of the polyethylene or polypropylene surface. Any treatment of the applied transfer image is unnecessary though it may be in some instances be desired as improving the final product. The printing ink can, if desired, comprise other resins, e.g. tackifying resins, to modify and improve the properties thereof. For example, a terpene resin may be incorporated.

The thermoplastic linear polyamide resins used in this embodiment preferably have the formula: HOOCRCOO(NHR$^1$NHCORCO)$_{n-1}$NHR$^1$NH$_2$, wherein $n$ is an integer, R is a substituted cyclohexane ring of dilinoleic acid, i.e.:

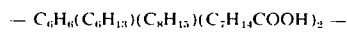

and R$^1$ is a polyalkylene polyamide such as ethylene diamine or diethylene triamine; the mean molecular weight of the final resin being in the region 3,000 to 9,000.

These resins are all typified by having good solubility in alcohols with the following physical characteristics:

| Acid Value/mg. KOH/gm. | Amine Value/mg. KOH/gm. | Softening Point |
|---|---|---|
| 2–8 | 2–6 | 90–130°C |

A wide variety of such thermoplastic linear polyamide resins is available commercially, for example those sold under the following Trade Marks by the following companies:

| | |
|---|---|
| VERSAMID 735 | |
| VERSALON 1140 | Cray Valley Products Ltd. |
| VERSALON 1112 | |
| CASAMID 201 and 202 | T. Swan and Co. |
| WOLFAMID 46 | |
| WOLFAMID 12 | Victor Wolf Ltd. |
| WOLFAMID 19 | |

The properties of terpene resins which may be incorporated in the printing ink, as a tackifying resin, are not in general important. However, such resins are exemplified by Terpene resin A115 (sold by Picco Corporation) which is a terpene resin derived from the residues of petroleum distillation and characterised by a melting point of 115°C and a very low acid number. Terpene resins are also frequently produced by the distillation of pine tree stumps. It has been found that these heat transfer materials, without the application of any further layers or processing steps, may be applied, e.g. by flat bed, platen or rotary press, to treated polyethylene or polypropylene, and there may be transferred to the substrate monochromic or multicoloured designs which are firmly adherent to the substrate.

The printing ink used may also be based on other thermoplastic resinous materials such as, for example, a polyvinyl chloride, polymethyl methacrylate, polyvinyl butyral or polystyrene. Preferred such thermoplastic materials are alkyl methacrylates of lower molecular weight than that used for the acrylic resin layer, alone or in association with a proportion of polyvinyl chloride.

The printing ink must contain a pigmenting material and a solvent medium. The solvent is preferably so chosen that it has little or no solvent effect, under normal printing conditions, on the acrylic resin layer. A suitable solvent mixture is one consisting of 3 parts of ethylene glycol monoethyl ether and 1 part of toluene.

Any white, black or coloured pigments commonly used in printing inks, e.g. baryta, lithopone, china clay, titanium dioxide, carbon black, chrome yellow, prussian blue or vermilion, may be used.

The image may consist of two or more layers of printing ink, in which case only the last or uppermost layer need be thermoplastic.

The hard acrylic resin layer is conveniently applied to the carrier film by a gravure process and will generally be a uniform layer over the whole carrier film. Its coating weight may be, for example 0.5 to 2 g/sq. meters, a coating weight of 0.8 to 1.2 g/sq. meters being particularly suitable. It is preferably unpigmented but may contain an amount of pigment insufficient materially to affect its release from the carrier film at elevated temperatures.

The ink may be formulated so as to be suitable for gravure printing. In this case, while the speed of release of the image from the carrier is an important factor, a factor of equal or greater importance is the automatic provision over the image, and preferably also over the surrounding receptor surface, of the an abrasion resistant coating which is accomplished here by the acrylic layer. If the ink is formulated for application by screen process printing it will usually contain a relatively high proportion of pigment present in the greater image thickness applied.

The following Examples will serve to illustrate the invention. All parts and percentages are by weight.

EXAMPLE 1

There is applied to a polyethylene terephthalate carrier film of 0.003 inch thickness an overall coating of a hard acrylic resin by the gravure printing on the carrier film of a composition as follows:

| | |
|---|---|
| Paraloid A.10 (hard acrylic resin being acrylic/methacrylic ester thermoplastic polymer, as a 30% solution in ethylene glycol monoethyl ether acetate) | 55% |
| Ethylene glycol monoethyl ether acetate and/or Ethylene glycol monoethyl ether | 45% |

There is then printed onto the dried acrylic resin coating thus obtained, images in ink of the following formulation:

12 parts thermoplastic linear polyamide resin of mean molecular weight 3,000 to 9,000 acid value/mg. KOH/gm 2–8, amine value/mg. KOH/gm 2–6 and softening point 90°–130°C and of formula:
HOOCRCOO(NHR$^1$NHCORCO)$_{n-1}$NHR$^1$NH$_2$
wherein, R, R$^1$ and $n$ are as given above (Versamid 735, sold by Cray Valley Products Ltd.);

15 parts pigment, Irgalite Blue BGL (sold by CIBA-GEIGY (UK) Ltd.);

52 parts toluene;

21 parts isopropyl alcohol.

EXAMPLE 2

The procedure as in Example 1 is followed but substituting a silk screen ink of the following formulation:

30 parts thermoplastic linear polyamide resin of mean molecular weight 3,000 to 9,000, acid value/mg. KOH/gm 2–8, amine value/mg. KOH/gm 2–6 and softening point 90°–130°C and of the formula:
HOOCRCOO(NHR$^1$NHCORCO)$_{n-1}$NHR$^1$NH$_2$
wherein, R, R$^1$ and $n$ are as given above (Versamid 735);

30 parts methyl isobutyl carbinol;

15 parts ethylene glycol monoethyl ether;

5 parts di-ethylene glycol monoethyl ether;

20 parts rubine toner BS.

Instead of the Versamid referred to in these Examples there may be employed other synthetic linear polyamide resins.

EXAMPLE 3

The procedure in Example 1 but using an ink of the following formulation (by weight):

Thermoplastic linear polyamide resin (Versamid 735 as above): 26.0 parts

α-Terpene resin derived from the residues of petroleum distillation and characterised by a melting point of 115°C and a very low acid number (Terpene Resin A 115 sold by Picco Corporation):

| | |
|---|---|
| Red pigment (Rubine B.S. sold by I.C.I. Ltd.): | 8.0 parts |
| methyl isobutyl carbinol | 17.0 parts |
| ethylene glycol monoethyl ether | 25.0 parts |
| finely divided silica (Aerosil 300 sold by Degussa): | 22.0 parts |
| | 2.0 parts. |

Whilst the heat transfer materials comprising a printing ink comprising a thermoplastic linear polyamide resin are of particular value in the application of designs or symbols to flame-treated polyethylene or polypropylene surfaces they may also be used to apply designs or symbols to surfaces of polyethylene terephthalate, urea formaldehyde resins, melamine-formaldehyde resins and polyamides.

EXAMPLE 4

There is applied to a polyethylene terephthalate carrier film of 0.003 inch thickness an overall coating of a hard acrylic resin by the gravure printing on the carrier film of a composition as follows:

| | |
|---|---|
| Paraloid A.10 (hard acrylic resin being acrylic/methacrylic ester thermoplastic polymers, as a 30% solution in ethylene glcyol monoethyl ether acetate) | 55% |
| Ethylene glycol monoethyl ether acetate and/or Ethylene glycol monoethyl ether | 45% |

There is then printed onto the dried acrylic resin coating thus obtained, images in ink of the following formulation:

| | |
|---|---|
| Vinalak 5620 (methyl methacrylate/butyl methacrylate copolymer) | 23% |
| Paraloid A.10 (as above) | 25% |
| Ethylene glycol monoisopropyl ether acetate | 28% |
| Toluene | 9% |
| Pigment | 15% | and the ink is dried down.

The printed product is slit to ribbon form so that it carries successive discrete printed images along the length of the ribbon. It is used to apply the images to articles made of a soft vinyl resin by a technique in which each image is applied under light pressure by application of a heated die. The area of the die is preferably somewhat larger than the area of the printed image, and if desired may be substantially coterminous with the surface of the article to which the printed image is to be applied. The optimum die temperature will depend on the speed at which the transfers are to be effected and will generally be in the range of 120° to 200°C.

It was found that the images transferred immediately to the soft vinyl resin articles and that the carrier film could be stripped away immediately after the transfer had been effected, without waiting for the heat transfer to cool. The images transferred cleanly and in unbroken condition, adhered strongly to the vinyl resin substrates and were protected against abrasion by the presence, covering the image and an adjoining area on the substrate, of the thin layer of hard acrylic resin.

EXAMPLE 5

The procedure of Example 4 was repeated but applying the hard acrylic coating from a composition of:

| | |
|---|---|
| Polaroid A.11 (acrylic/methacrylic ester thermoplastic polymer: 100% solids) | 17% |
| Ethylene glycol monoethyl ether | 83% |

EXAMPLE 6

The procedure of either Example 4 or 5 was followed but substituting a silk screen ink of the following formulation:

| | |
|---|---|
| Titanium dioxide | 30.0% |
| Polyvinyl resin (polyvinyl chloride acetate, code VYHH sold by Bakelite Ltd.) | 6.3% |
| Polyvinyl resin (polyvinyl chloride acetate, code VYHD sold by Bakelite Ltd.) | 6.1% |
| Polyacrylic resin (methyl methacrylate/butyl methacrylate copolymer, sold under the Trade Mark VINALAK 6250) | 11.4% |
| Paraloid A.10 (as above) | 8.4% |
| Ethylene glycol monoisopropyl ether acetate | 37.8% |

It was found that the ink so formulated would adhere strongly to a wide range of thermoplastic resin substrates when applied by the technique disclosed in Example 4, e.g. impact polystyrene, flexible and rigid polyvinyl chlorides, acrylic resins, cellulose acetate, polycarbonate, styrene/acrylonitrile copolymers and acrylic/butadiene/styrene terpolymers.

EXAMPLE 7

There is printed onto the dried acrylic resin coating of the polyethylene terephthalate carrier film of Example 4, a design of a four colour half tone design; the inks used being conventional nitrocellulose based gravure inks wherein the ink vehicle has the following composition:

| | % by weight |
|---|---|
| Elvacite 2043 (Ethyl methacrylate resin of low molecular weight) | 15.0 |
| n-Propyl acetate | 20.3 |
| Ethyl alcohol | 49.8 |
| 2-Nitro propane | 7.8 |
| Alcohol soluble low viscosity nitrocellulose damped with isopropyl alcohol | 7.1 |
| | 100.0 |

The inks contain the following pigments dispersed in amounts of 10% by weight: Phthalocyamine Blue, Benzidene Yellow, Carmine Red and Brunswick Green. These conventional inks have good flow properties and thus give good final print definition.

White thermoplastic ink is applied over the discrete design so that it overlaps the design by about one-sixteenth inch all round. This ensures that during heat transfer when the white ink becomes tacky all the design is transferred. This white ink has the following composition:

| | |
|---|---|
| Vinalak 5620 (methyl methacrylate/butyl methacrylate copolymer) | 23% |
| Paraloid A.10 (as above) | 25% |
| Ethylene glycol monoisopropylether acetate | 28% |
| Toluene | 9% |
| Titanium white | 15% |

The design was transferred by the method described in Example 4.

To provide a heat transfer suitable for transfer to polyethylene or polypropylene the Vinalak 5620 and the Paraloid A.10 of the white ink may be replaced by the Versamid 735 described above.

We claim:

1. A heat transfer material consisting essentially of a film carrier of polyethylene terephthalate, a thermoplastic layer consisting essentially of an acrylic resin adherent to said film carrier, said layer being essentially unpigmented, and a thermoplastic image in printing ink upon said acrylic resin layer, the acrylic resin having a hardness sufficient to reduce the bond between the polyethylene terephthalate carrier and acrylic layer upon application of heat, such bond at elevated temperatures being weaker than the bond between the thermoplastic image and a receiver surface at such elevated temperatures, whereby the carrier film may be stripped from said acrylic layer at substantially the same temperatures used to effect image transfer to leave the image firmly adhered to the receiver surface and at least a portion of said acrylic layer adhered to the receiver surface and covering said image.

2. A heat transfer material according to claim 1 wherein the thermoplastic image in printing ink comprises a thermoplastic linear polyamide resin.

3. A heat transfer material according to claim 1 wherein the thermoplastic image in printing ink comprises a thermoplastic resinous material selected from the class consisting of polyvinyl chloride, polymethyl methacrylate, polyvinyl butyral and polystyrene.

4. A heat transfer material according to claim 3 wherein the acrylic resin is a polyalkyl methacrylate and the ink is based on a polyalkyl methacrylate of lower molecular weight than the polyalkyl methacrylate used for the acrylic resin layer.

5. A heat transfer material according to claim 1 wherein the acrylic resin is selected from the class consisting of polymers of acrylic and methacrylic esters, and copolymers of such esters and corresponding acids with other monomers copolymerisable therewith.

6. A heat transfer material according to claim 2 wherein the acrylic resin is selected from the class consisting of polymers of acrylic and methacrylic esters, and copolymers of such esters and corresponding acids with other monomers copolymerisable therewith.

7. A heat transfer material according to claim 1 wherein the acrylic resin is an acrylic/methacrylic ester resin having a Knoop hardness of 21 to 22.

8. A heat transfer material according to claim 1 wherein the coating weight of the acrylic resin layer is 0.5 to 2 g/sq. meters.

9. A heat transfer material according to claim 8 wherein the coating weight is 0.8 to 1.2 g/sq. meters.

10. A heat transfer material according to claim 1 wherein the thermoplastic image is smaller in extent than the acrylic resin layer.

11. A heat transfer material according to claim 1 wherein the image consists of at least two layers of printing ink, at least the uppermost layer being thermoplastic.

* * * * *